United States Patent
Qin et al.

(10) Patent No.: US 9,954,718 B1
(45) Date of Patent: Apr. 24, 2018

(54) REMOTE EXECUTION OF APPLICATIONS OVER A DISPERSED NETWORK

(75) Inventors: Xiaochuan Qin, Seattle, WA (US); Alexandre P. Moura, Kirkland, WA (US); Ethan Z. Evans, Snoqualmie, WA (US); Ian M. Bone, Seattle, WA (US); Eden Jn Baptiste, Orlando, FL (US); Richard D. Krog, Seattle, WA (US); Kerry Chang, Seattle, WA (US); Mario Vargas Adoc, Jr., Seattle, WA (US); Jun Zhou, Mason, OH (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 13/348,052

(22) Filed: Jan. 11, 2012

(51) Int. Cl.
*G06F 15/16* (2006.01)
*H04L 29/08* (2006.01)
*G06F 15/173* (2006.01)

(52) U.S. Cl.
CPC .......... *H04L 29/08* (2013.01); *G06F 15/173* (2013.01)

(58) Field of Classification Search
CPC .......... G06F 15/16; G06F 12/00; G06F 12/14
USPC ...................... 709/203, 201, 202
See application file for complete search history.

(56) References Cited

U.S. PATENT DOCUMENTS

| 5,953,707 A | 9/1999 | Huang et al. |
|---|---|---|
| 6,115,370 A * | 9/2000 | Struhsaker et al. .......... 370/342 |
| 6,463,454 B1 | 12/2002 | Lumelsky et al. |
| 7,453,801 B2 | 11/2008 | Taneja et al. |
| 7,555,497 B2 | 6/2009 | Thompson et al. |
| 7,747,255 B2 | 6/2010 | Dacosta et al. |
| 7,774,184 B2 | 8/2010 | Balci et al. |
| 7,953,842 B2 | 5/2011 | Dillon et al. |
| 7,970,897 B1 | 6/2011 | Baumback et al. |
| 8,244,804 B1 * | 8/2012 | Casselman .............. H04L 67/34 463/42 |
| 8,285,574 B2 | 10/2012 | Boss et al. |
| 8,303,415 B2 * | 11/2012 | Craine et al. .................. 463/42 |
| 8,612,596 B1 | 12/2013 | Li et al. |
| 8,738,437 B2 | 5/2014 | Gailey et al. |
| 2002/0032751 A1 * | 3/2002 | Bharadwaj .................... 709/218 |
| 2002/0138640 A1 | 9/2002 | Raz et al. |

(Continued)

FOREIGN PATENT DOCUMENTS

| EP | 1555614 B1 * | 7/2007 |
|---|---|---|
| WO | WO 2007073349 A1 * | 6/2007 |

OTHER PUBLICATIONS

Zivic, Natasa, Rehman, Obaid. On using the message digest for error correction in wireless communication networks. Institute for Data Communications Systems University of Siegen. 2000. p. 1-5.

(Continued)

*Primary Examiner* — Viet D Vu
*Assistant Examiner* — James A Edwards
(74) *Attorney, Agent, or Firm* — Thomas Horstemeyer, LLP (57) ABSTRACT

Disclosed are various embodiments of a server application that facilitates selecting a computing device in which to host execution of an application. The selected application host provides application output to a client, and the client provides application input to the application host. In some embodiments, the application server may be a communications proxy between the client and a remote application host.

19 Claims, 5 Drawing Sheets

(56) References Cited

U.S. PATENT DOCUMENTS

| | | | |
|---|---|---|---|
| 2002/0154214 A1* | 10/2002 | Scallie | G02B 27/017 348/51 |
| 2003/0152034 A1 | 8/2003 | Zhang et al. | |
| 2003/0208392 A1 | 11/2003 | Shekar et al. | |
| 2004/0128261 A1 | 7/2004 | Olavson et al. | |
| 2004/0242322 A1 | 12/2004 | Montagna et al. | |
| 2005/0192099 A1 | 9/2005 | Nguyen et al. | |
| 2005/0197896 A1 | 9/2005 | Veit et al. | |
| 2005/0197897 A1 | 9/2005 | Veit et al. | |
| 2005/0273507 A1 | 12/2005 | Yan et al. | |
| 2006/0161504 A1 | 7/2006 | Walser et al. | |
| 2006/0257048 A1* | 11/2006 | Lin | G06K 9/00711 382/276 |
| 2007/0150571 A1* | 6/2007 | Haga | G06Q 10/06 709/223 |
| 2007/0208751 A1 | 9/2007 | Cowan et al. | |
| 2008/0102954 A1 | 5/2008 | Schueller | |
| 2008/0271038 A1 | 10/2008 | Rolia et al. | |
| 2009/0021518 A1 | 1/2009 | Harada | |
| 2009/0204711 A1* | 8/2009 | Binyamin | H04L 67/16 709/226 |
| 2010/0023582 A1* | 1/2010 | Pedersen et al. | 709/203 |
| 2010/0082733 A1* | 4/2010 | Bernstein | H04L 12/6418 709/203 |
| 2010/0153198 A1 | 6/2010 | Murphy et al. | |
| 2010/0185455 A1 | 7/2010 | Miller | |
| 2011/0022812 A1* | 1/2011 | van der Linden | G06F 9/5077 711/163 |
| 2011/0078318 A1 | 3/2011 | Desai et al. | |
| 2011/0083098 A1* | 4/2011 | Cisler et al. | 715/784 |
| 2011/0238460 A1 | 9/2011 | Al-Dawsari et al. | |
| 2012/0131095 A1 | 5/2012 | Luna et al. | |
| 2012/0166518 A1* | 6/2012 | Alev et al. | 709/203 |
| 2012/0246638 A1 | 9/2012 | He et al. | |
| 2013/0066945 A1* | 3/2013 | Das | G06F 15/16 709/203 |
| 2013/0086147 A1* | 4/2013 | Kashyap | 709/203 |
| 2013/0219021 A1 | 8/2013 | Acharya et al. | |

OTHER PUBLICATIONS

U.S. Appl. No. 13/408,628, filed Feb. 29, 2012, Response to Non-Final Office Action dated Aug. 11, 2016.
U.S. Appl. No. 13/408,628, filed Feb. 29, 2012, Non-Final Office Action dated Aug. 11, 2016.
U.S. Appl. No. 13/408,628, filed Feb. 29, 2012, Response to Final Office Action dated Sep. 8, 2015.
U.S. Appl. No. 13/408,628, filed Feb. 29, 2012, Final Office Action dated Sep. 8, 2015.
U.S. Appl. No. 13/408,628, filed Feb. 29, 2012, Response to Non-Final Office Action dated Apr. 24, 2015.
U.S. Appl. No. 13/408,628, filed Feb. 29, 2012, Non-Final Office Action dated Apr. 24, 2015.
U.S. Appl. No. 13/408,628, filed Feb. 29, 2012, Response to Non-Final Office Action dated Dec. 14, 2012.
U.S. Appl. No. 13/408,628, filed Feb. 29, 2012, Non-Final Office Action dated Dec. 14, 2012.
U.S. Appl. No. 14/578,622, filed Dec. 22, 2014, Notice of Allowance dated Mar. 8, 2017.
U.S. Appl. No. 14/578,622, filed Dec. 22, 2014, Response to Final Office Action dated Oct. 3, 2016.
U.S. Appl. No. 14/578,622, filed Dec. 22, 2014, Response to Non-Final Office Action dated Feb. 1, 2016.
U.S. Appl. No. 14/578,622, filed Dec. 22, 2014, Non-Final Office Action dated Feb. 1, 2016.
U.S. Appl. No. 13/408,680, filed Feb. 29, 2012, Notice of Allowance dated Aug. 15, 2014.
U.S. Appl. No. 13/408,680, filed Feb. 29, 2012, Response to Final Office Action dated Apr. 30, 2014.
U.S. Appl. No. 13/408,680, filed Feb. 29, 2012, Final Office Action dated Apr. 30, 2014.
U.S. Appl. No. 13/408,680, filed Feb. 29, 2012, Response to Non-Final Office Action dated Oct. 24, 2013.
U.S. Appl. No. 13/408,680, filed Feb. 29, 2012, Non-Final Office Action dated Oct. 24, 2013.

* cited by examiner

REMOTE EXECUTION OF APPLICATIONS OVER A DISPERSED NETWORK

BACKGROUND

People may use many different computing devices with diverse computing and communications capabilities. Some applications require computing devices with specific computing and communications capabilities in order to operate. Due to the variety of computing devices and applications used, many applications may not be operable on a particular computing device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing remote execution of applications by employing a dispersed network of computing devices. Many interactive applications require a prompt, responsive user-interface for the application to be operable and for users to receive a satisfactory experience. Various embodiments of the present disclosure are configured to execute applications in computing devices selected based at least upon the ability to provide a responsive user-interface for the application. To this end, computing devices may be chosen to provide execution of an application based on various factors such as network and computing resources available, network path latency, reliability, and/or other factors. Under some circumstances, a dispersed network of computing devices may provide an improved level of responsiveness due to the potential to be located in close proximity to the clients, and the ability to easily scale to meet demand. Furthermore, if during an application session, a computing device becomes available that may offer improved performance, the application session may be transitioned to that computing device during the same application session with minimal interruption. In the following discussion, a general description of the system and its components is provided, followed by a discussion of the operation of the same.

Figure 1:
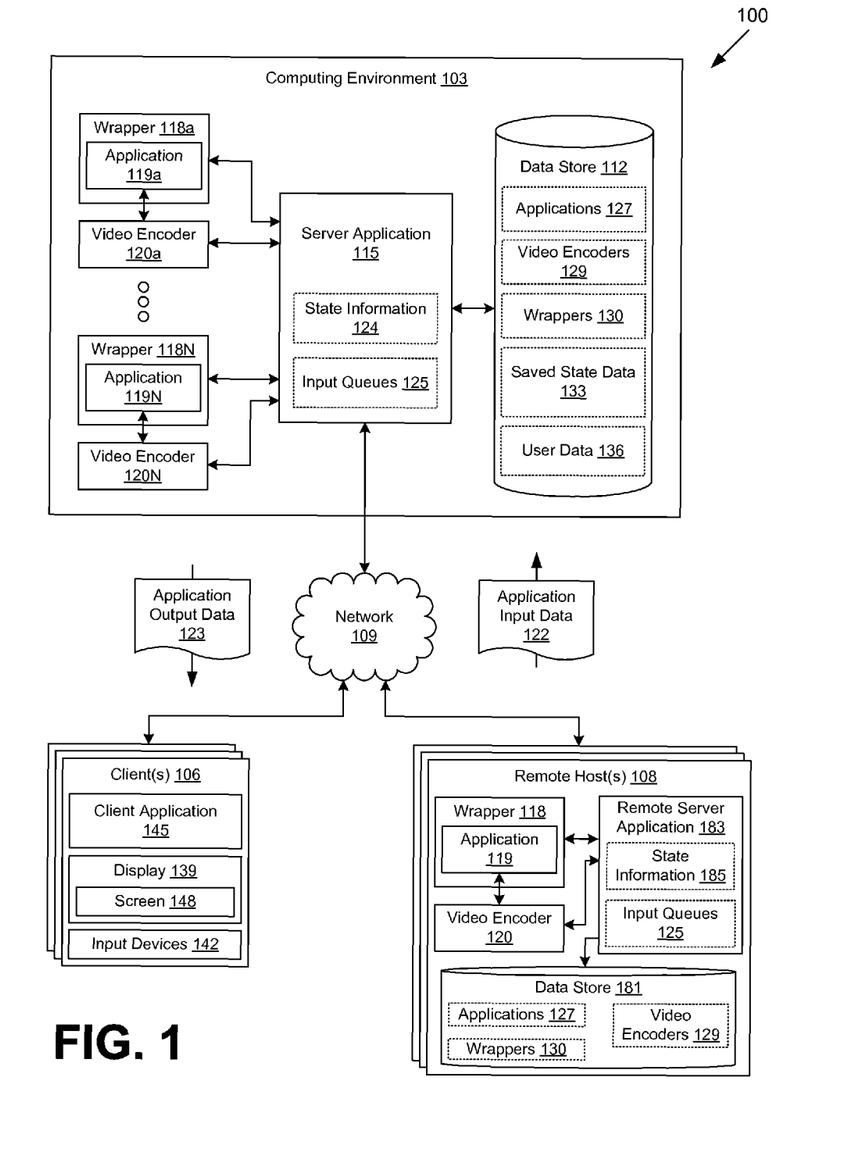
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 and remote hosts 108 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cloud computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a server application 115, a plurality of wrappers 118a . . . 118N, a plurality of applications 119a . . . 119N, a plurality of video encoders 120a . . . 120N, and other applications, services, processes, systems, engines, or functionality not discussed in detail herein. The server application 115 may correspond to a game server application or another type of application session server. The server application 115 is executed to launch applications 119, which are executed within the wrappers 118. In some embodiments, the server application 115 may dispatch the execution of applications 119 to remote hosts 108 based upon available computing resources, network path latency, reliability and/or other factors as can be appreciated. The server application 115 may also be executed to obtain application input data 122 from the clients 106 and provide the application input data 122 to the respective wrapper 118.

The server application 115 is also executed to send application output data 123 that is captured from the application 119 to the clients 106. In some embodiments, the server application 115 may facilitate the client 106 communicating directly with a remote host 108. The server application 115 may communicate with the client 106 and the remote hosts 108 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain state information 124 and input queues 125 associated with the executing applications 119.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, or another type of input device.

Further, the wrapper 118 is able to obtain a video signal generated by the application 119 as if the wrapper 118 emulates a display device, an audio device, or another type of output device. The wrapper 118 is able to encode the video signal by way of a video encoder 120 into a media stream. The media stream may include an audio signal generated by the application 119 as well. To this end, the wrapper 118 may include various types of video encoders 120, such as, for example, Moving Pictures Experts Group (MPEG) encoders, Theora, VP8, Flash® and/or other video formats. Such video encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the server application 115 includes various data relating to application sessions that are currently active, as well as the resources and availability of the computing environment 103 and remote hosts 108. For example, the state information 124 may track the location and computing resources of available remote hosts 108, users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119.

The data stored in the data store 112 includes, for example, applications 127, video encoders 129, wrappers 130, saved state data 133, user data 136, and potentially other data. The applications 127 correspond to a library of different applications that are available to be launched as applications 119. The applications 127 may correspond to executable code within the computing environment 103 and/or remote hosts 108. Alternatively, the applications 127 may correspond to code that is executable within another type of device, but is not executable within the computing environment 103 and/or remote hosts 108. Such applications 127 may be referred to as "binaries," read-only memory images (ROMs), and other terms. A particular application 127 may be executed as multiple instances of the applications 119 for multiple application sessions.

The video encoders 129 correspond to the various types of video encoders 120 that may be employed in the computing environment 103 and/or remote hosts 108. Some video encoders 129 may correspond to specific formats, such as, for example, MPEG-4, MPEG-2, Theora, VP8, Flash® and/or other formats. The wrappers 130 correspond to the executable code that implements the various types of wrappers 118. The wrappers 130 are executable in the computing environment 103 and/or remote hosts 108, and may be executed as multiple instances of the wrappers 118 for multiple game sessions.

The saved state data 133 corresponds to states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 136 includes various data related to the users of the applications 119, such as, for example, security credentials, application preferences, billing information, a listing of other users that are permitted to join application sessions started by the user, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. The client application 145 is executed to allow a user to launch, join, play, or otherwise interact with an application 119 executed in the computing environment 103 and/or remote host 108. To this end, the client application 145 is configured to capture input commands provided by the user through one or more of the input devices 142 and send this input over the network 109 to the computing environment 103 and/or remote host 108 as application input data 122. In some embodiments, the client application 145 may also provide geographic location data through the use of the Global Positioning System (GPS), cell network positioning, Wi-Fi™ positioning and/or other location techniques.

The client application 145 is also configured to obtain application output data 123 over the network 109 from the computing environment 103 and/or remote host 108 in order to render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input.

The remote host 108 may comprise, for example, a personal computer or any other system providing computing capability. Alternatively, a plurality of remote hosts 108 may be employed that are arranged, for example, in one or more computer banks or other arrangements. For example, a plurality of remote hosts 108 together may comprise a cloud computing resource, a grid computing resource, and/or any other distributed computing arrangement. Such remote hosts 108 may be located in a single installation or may be distributed among many different geographical locations. For purposes of convenience, the remote host 108 may be referred to herein in the singular. Even though the remote host 108 is referred to in the singular, it is understood that a plurality of remote hosts 108 may be employed in the various arrangements as described above.

Various applications and/or other functionality may be executed in the remote host 108 according to various embodiments. Also, various data is stored in a data store 181 that is accessible to the remote host 108. The data store 181 may be representative of a plurality of data stores 181 as can be appreciated. The data stored in the data store 181, for example, is associated with the operation of the various applications and/or functional entities described below.

The components executed on the remote host 108, for example, include at least one wrapper 118, at least one application 119, at least one video encoder 120, a remote server application 183, and other applications, services, processes, systems, engines, or functionality not discussed in detail herein. The remote server application 183 may correspond to a game server application or another type of application session server. The remote server application 183 is executed to launch applications 119, which are executed within the wrappers 118. The remote server application 183 is also executed to obtain application input data 122 from the computing environment 103 and/or clients 106 and provide the application input data 122 to the respective wrapper 118.

The remote server application 183 is also executed to send application output data 123 that is captured from the application 119 to the computing environment 103 and/or clients 106. In some embodiments, the remote server application 183 may communicate with the client 106 using the computing environment 103 as an intermediary. In other embodiments, the remote server application 183 may communicate directly with the client 106, providing only metadata to the computing environment 103. The remote server application 183 may communicate with the computing environment 103 and/or clients 106 over various protocols such as, for example, HTTP, SOAP, REST, RTP, RTSP, RTMP, UDP, TCP, and/or other protocols for communicating data over the network 109. The remote server application 183 is configured to maintain state information 185 and input queues 125 associated with the executing applications 119. Furthermore, all or portions of the state information 185 may be transmitted to the computing environment 103.

The state information 185 that is maintained by the remote server application 183 includes various data relating to the application sessions that are currently active, as well as the network and computing resources. For example, the state information 185 may track the users that are currently participating in the application session, resources consumed and available, status information associated with the users, network latency between the remote host 108 and the client 106 and/or computing environment 103, security permissions associated with the application session (e.g., who can or cannot join), and so on. In some embodiments, some or all of the state information 185 may be discarded when an application session ends.

Next, a general description of the operation of the various components of the networked environment 100 is provided. To begin, a user at a client 106 sends a request to launch an application 119 to the server application 115. The server application 115 may attempt to identify the location from which the client 106 sent the request. To this end, the server application 115 may use location data provided by the client 106 using GPS, a user-specified location and/or potentially other location techniques. Additionally, the server application 115 may locate the client 106 based upon the network address of the client 106, a user-specified location and/or potentially other location techniques. Furthermore, the server application 115 may identify the network and/or network service provider used by the client 106.

Once the location of the client 106 is identified, the server application 115 may select a preferred application host in which to launch the application 119. The preferred application host will be chosen from among the computing environment 103 and the remote hosts 108 based upon compatibility with the particular client 106 and execution of the particular application 119. The compatibility may be judged based on various factors such as, for example, network and computing resources available, proximity, network and network service provider, network path latency, reliability, and other factors as can be appreciated. As a non-limiting example, a remote host 108 may be chosen as the preferred application host for a client 106 because the remote host 108 and client 106 share the same network service provider and are located within the same city. In the event that the factors favor a plurality of computing devices equally, various factors for distribution may be used to select a preferred application host from among the candidate application hosts such as, for example, random selection, round-robin, and/or other factors as can be appreciated.

If the computing environment 103 is chosen as the preferred application host for the application session, the server application 115 obtains the corresponding application 127, video encoder 129, and wrapper 130 from the data store 112. The server application 115 then launches the application 119 in the corresponding wrapper 118 using any specified saved state data 133 associated with the user. The server application 115 tracks the status of the application 119 within the state information 124.

Alternatively, if a remote host 108 is chosen as the preferred application host for the application session, the server application 115 may notify the remote server application 183 of the pending application session. The remote server application 183 obtains the corresponding application 127, video encoder 129, and wrapper 130 from the data store 181. Additional data that may be needed, such as saved state data 133, user data 136 and/or other data not stored in the data store 181, may be retrieved from the server application 115. The remote server application 183 then launches the application 119 in the corresponding wrapper 118 using any specified saved state data 133 associated with the user. The remote server application 183 tracks the status of the application 119, as well as the status and performance of the resources associated with the remote host 108. All or portions of the state information 185 may be transmitted periodically to the server application 115.

Regardless of the device chosen as the preferred application host, the wrapper 118 provides a hosted environment for execution of the application 119. In some embodiments, the hosted environment may include a virtualized environment for the application 119 that virtualizes one or more resources of the computing environment 103 and/or remote host 108. Such resources may include exclusive resources, i.e., resources for which the application 119 requests exclusive access. For example, the application 119 may request full screen access from a video device, which is an exclusive resource because normally only one application can have full screen access. Furthermore, the wrapper may virtualize input devices such as, for example, keyboards, mice, etc., which may not actually be present in the computing environment 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. For an application 119 executed in a remote host 108, the application input data 122 may be transmitted from the client 106 directly to the remote host 108 over the network 109, or the computing environment 103 may be used as a communications proxy between the client 106 and the remote host 108. Alternatively, for an application 119 executed in a computing environment 103, the application input data 122 is transmitted from the client 106 to the computing environment 103 over the network 109. The server application 115 and/or remote server application 183 receives the input command, adds it to the input queue 125 for the application 119, and ultimately passes it to the wrapper 118. The wrapper 118 then provides a left mouse button depression to the application 119 by way of a virtualized mouse.

Under various circumstances, it may be useful to ensure that the input command is synchronized with the video frame presented to the user on the screen 148 when the user generated the input command in the client 106. As a non-limiting example, because of the various latencies of the system, a fireball intended to be thrown by the character controlled by the user in a fighting game may be thrown later than intended. In some cases, this may not matter. For example, the user may merely want to throw the fireball, and a short delay in throwing the fireball may be perfectly acceptable to the user. However, for more precision, the application 119 may support an application programming interface (API) that allows the wrapper 118 to associate a frame number or other temporal identifier with an input command. Therefore, the application 119 can know precisely when the input command was performed and react accordingly. The frame number or other temporal identifier may be sent to the server application 115 and/or remote server application 183 by the client application 145 as metadata for the input command.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing environment 103 and/or remote hosts 108 in some embodiments. The media stream, haptic feedback and/or other data associated with the application 119 may be encoded into a format that may be transmitted over the network 109 within the application output data 123. For an application 119 executed in a remote host 108, the application output data 123 may be transmitted directly to the client 106 over the network 109, or the computing environment 103 may be used as a communications proxy between the remote host 108 and the client 106. Alternatively, for an application 119 executed in the computing environment 103, the application output data 123 is transmitted to the client 106 over the network 109. The client application 145 or other application on the client 106 obtains the application output data 123 and renders a screen 148 on the display 139.

Subsequently, other users may join the application 119 and participate like the first user. A user may start an application 119 at one client 106 and continue the application 119 at another client 106. Furthermore, multiple users at diverse locations may participate in an application 119. As a non-limiting example, an application 119 may have been developed to be executed in one device with multiple game controllers. Accordingly, the wrapper 118 may be configured to map input commands from one client 106 to a first virtual game controller and input commands from another client 106 to a second virtual game controller. As another non-limiting example, an application 119 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the application 119 through an entirely different type of virtual input device. As a non-limiting example, input generated by an accelerometer in the client 106 may be translated by the wrapper 118 into input provided through a virtual mouse. Thus, completely different kinds of input devices 142 may be used in the application 119 that may not have been contemplated when the application 119 was implemented.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing environment 103 and/or remote host 108 may be upgraded as needed to meet the hardware requirements of the latest and most computationally intensive applications 119. In various embodiments, the video signal in the media stream sent by the server application 115 and/or remote server application 183 may be scaled according to the bitrate and/or other characteristics of the network 109 between the client 106 and the computing environment 103 and/or remote host 108.

Concurrent with the client 106 interacting with the application 119, the server application 115 may monitor the performance characteristics associated with execution of the application 119 found in the state information 124. The performance characteristics may include, for example, network and computing resources available, network path latency, client feedback, reliability, and/or other characteristics related to performance as can be appreciated. Additionally, the server application 115 may periodically reconfirm the location of the client 106 in order to adapt to a change in geographic location, as well as a change in the path of connectivity to the network 109.

Based upon the available resources as reported by the computing environment 103 and the remote hosts 108, the performance characteristics associated with execution of the application 119 in the preferred application host and potentially other factors, the server application 115 may select a successive application host to host the application session. The successive application host will be chosen from among the computing environment 103 and the remote hosts 108 based upon improved compatibility with the particular client 106, improved compatibility with execution of the particular application 119, and potentially other factors. The compatibility may be judged based on various factors such as, for example, network and computing resources available, proximity, network and network service provider, network path latency, reliability, and other factors as can be appreciated. In the event that the factors favor a plurality of computing devices equally, various factors for distribution may be used to select a successive application host from among the candidate successive application hosts such as, for example, random selection, round-robin, and/or other factors as can be appreciated.

If the computing environment 103 is chosen as the successive application host for the application session, the server application 115 obtains the corresponding application 127, video encoder 129, and wrapper 130 from the data store 112. The server application 115 may notify the client 106 of the change in application session host, and launch the application 119 in the corresponding wrapper 118 using any specified saved state data 133 associated with the user. The server application 115 tracks the status of the application 119 within the state information 124.

Alternatively, if a remote host 108 is chosen as the successive application host for the application session, the server application 115 may notify the remote server application 183 of the pending application session, as well as notify the client 106 of the change in application session host. The remote server application 183 obtains the corresponding application 127, video encoder 129, and wrapper 130 from the data store 181. Additional data that may be needed, such as saved state data 133, user data 136, wrappers 130 and/or other data not stored in the data store 181, may be retrieved from the server application 115. The remote server application 183 then launches the application 119 in the corresponding wrapper 118 using any specified saved state data 133 associated with the user. The remote server application 183 tracks the status of the application 119, as well as the status and performance of the resources associated with the remote host 108. All or portions of the state information 185 may be transmitted periodically to the server application 115.

Figure 2:
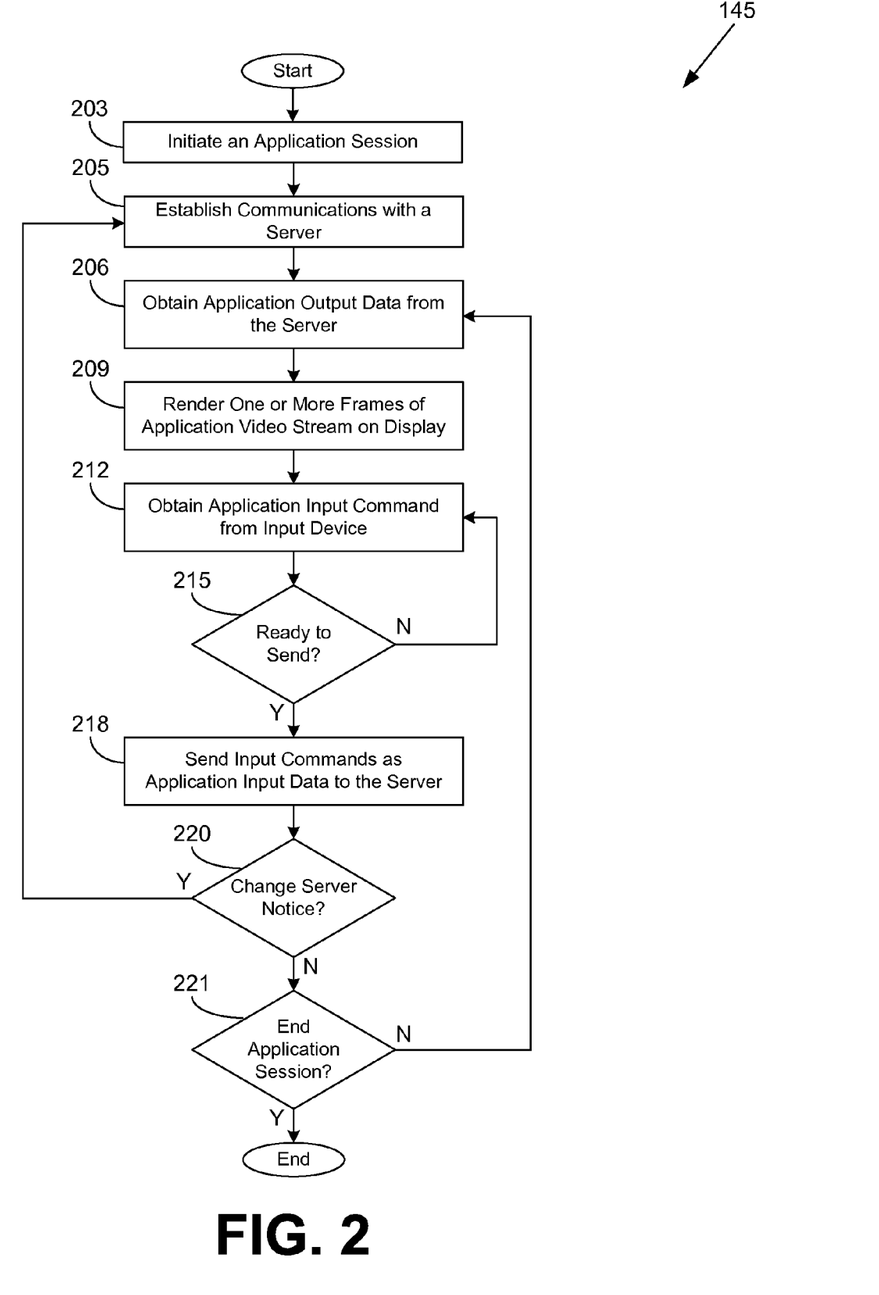
FIG. 2 is a flowchart illustrating examples of functionality implemented as portions of a client application executed in a client in the networked environment of FIG. 1 according to various embodiments of the present disclosure.

Referring next to FIG. 2, shown is a flowchart that provides one example of the operation of a portion of the client application 145 according to various embodiments. It is understood that the flowchart of FIG. 2 provides merely an example of the many different types of functional arrangements that may be employed to implement the operation of the portion of the client application 145 as described herein. As an alternative, the flowchart of FIG. 2 may be viewed as depicting an example of steps of a method implemented in the client 106 (FIG. 1) according to one or more embodiments.

Beginning with box 203, the client application 145 initiates a session of an application 119 (FIG. 1). To this end, the client application 145 may send a request to the server application 115 (FIG. 1) to begin a new session or to join an existing session of the application 119 executing in the computing environment 103 (FIG. 1) or remote host 108 (FIG. 1). Next, in box 205, the client 106 establishes direct communications with a remote host 108, if directed by the server application 115. In box 206, the client application 145 obtains application output data 123 (FIG. 1) from the server application 115 or remote server application 183 (FIG. 1). As discussed previously, the application output data 123 may also include audio stream data, force feedback data, and/or other data associated with the application 119. In box 209, the client application 145 renders one or more frames of the application video stream in a screen 148 (FIG. 1) on the display 139 (FIG. 1).

In response to the graphical and/or other output of the application 119 presented in the client 106, the user of the client application 145 may employ one or more of the input devices 142 (FIG. 1) for interacting with the application 119. Accordingly, one or more input commands may be generated by the one or more input devices 142. In box 212, the client application 145 obtains an application input command from an input device 142. Non-limiting examples of such input commands may include a left mouse button pressed, a left mouse button released, a key press on the keyboard, a motion of a joystick, a button press on a game controller, etc.

In box 215, the client application 145 determines whether the input commands are ready to be sent to the server application 115 and/or remote server application 183. In one example, the input commands may be sent to the server application 115 and/or remote server application 183 as soon as they are generated by the input devices 142. In another example, input commands may be sent in batches of one or more input commands at specific intervals. If the client application 145 determines that the input commands are not ready to be sent to the server application 115 and/or remote server application 183, the client application 145 returns to box 212 and obtains another application input command.

If the client application 145 instead determines that the input commands are ready to be sent, the client application 145 moves to box 218. In box 218, the client application 145 sends the input commands as application input data 122 (FIG. 1) to the server application 115 and/or remote server application 183. Along with the input commands, the application input data 122 may include various forms of metadata to ensure that the input commands are properly interpreted by the application 119. Such metadata may include a timestamp for each input command that indicates when the respective input command was generated in the client 106. Further, such metadata may include a video frame number or identifier to correlate a particular video frame with the input command. Other identifiers for correlating specific points in a media stream to input commands may be utilized in other embodiments.

If, in box 220, the client 106 communicating directly with a remote host 108 receives a notice to change to a different server, execution of the client application returns to box 205. Next, in box 221, the client application 145 determines whether the session of the application 119 is to be ended. For example, the user may decide to exit the application 119. In some embodiments, the application 119 may subsequently be terminated by the server application 115 and/or remote server application 183, while in other embodiments, the application 119 may continue executing in the computing environment 103 and/or remote host 108. If the application session is not to be ended, the client application 145 returns to box 206 and obtains additional application video data from the server application 115 and/or remote server application 183. Otherwise, the portion of the client application 145 ends. For embodiments of the client application 145 not permitting direct communications with remote hosts 108, boxes 205 and 220 may be eliminated from the flowchart above.

Figure 3A:
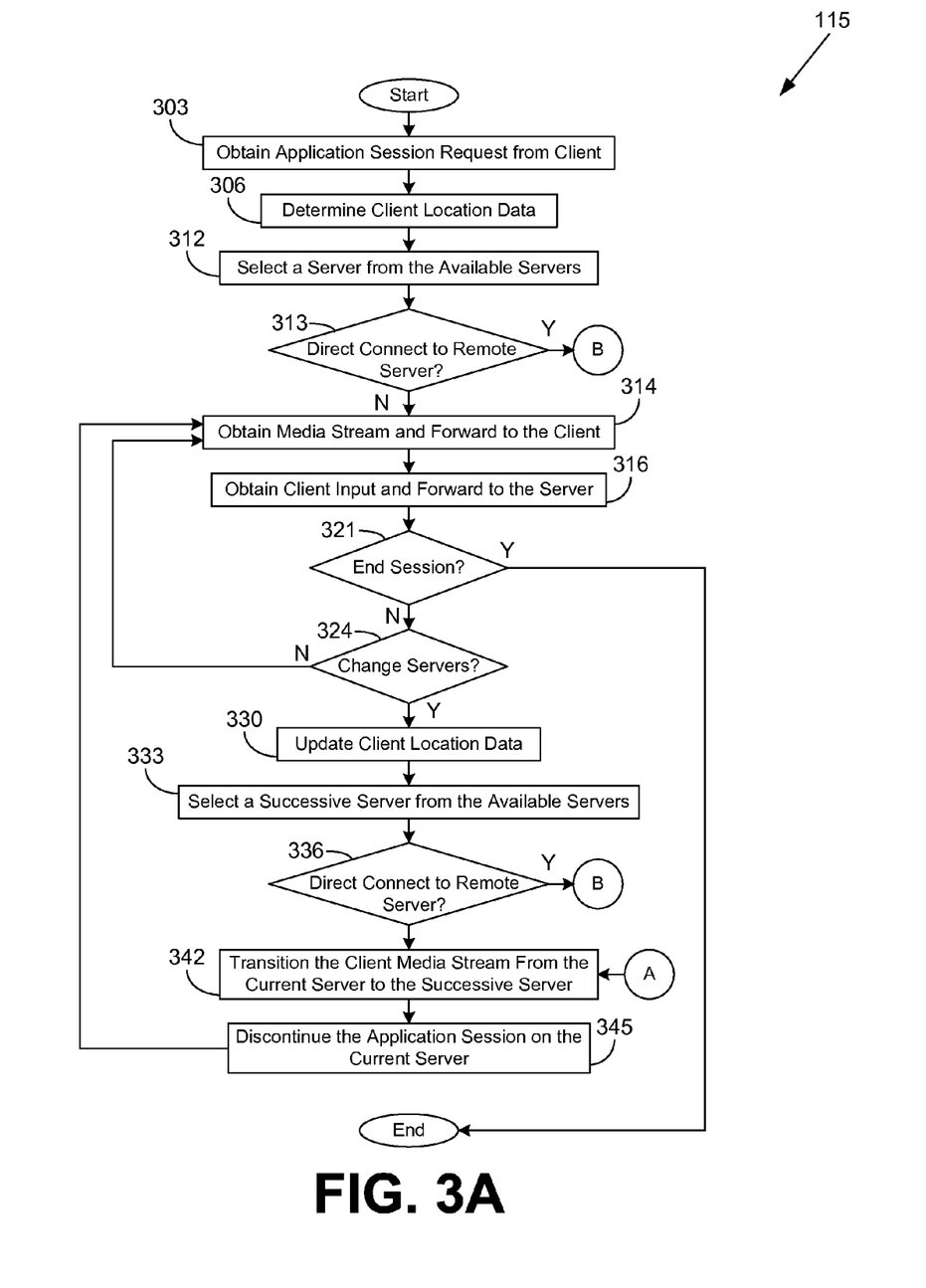
FIGS. 3A and 3B are flowcharts illustrating examples of functionality implemented as portions of a server application executed in a computing environment in the networked environment of FIG. 1 according to various embodiments of the present disclosure.

Moving on to FIG. 3A, shown is a flowchart that provides one example of the operation of a portion of the server application 115 according to various embodiments. It is understood that the flowchart of FIG. 3A provides merely an example of the many different types of functional arrangements that may be employed to implement the operation of the portion of the server application 115 as described herein. As an alternative, the flowchart of FIG. 3A may be viewed as depicting an example of steps of a method implemented in the computing environment 103 (FIG. 1) according to one or more embodiments.

Beginning with box 303, the server application 115 obtains an application session request from the client 106 (FIG. 1). Next, in box 306, the server application 115 determines the location of the client 106. The location may include the geographic location, network location data associated with the path of connectivity through the network 109 (FIG. 1) and/or potentially other location data. Subsequently, in box 312, the server application 115 identifies a preferred application host in which to launch the application 119 (FIG. 1). The preferred application host will be chosen from among the computing environment 103 and the remote hosts 108 (FIG. 1) based upon various factors such as, for example, network and computing resources available, proximity, network and network service provider, network path latency, reliability, and other factors as can be appreciated. If a remote host 108 is chosen as the preferred application host for the application session, the server application 115 may notify the remote server application 183 (FIG. 1) of the pending application session. Thereafter, execution of the application 119 may begin in the preferred application host.

Figure 3B:
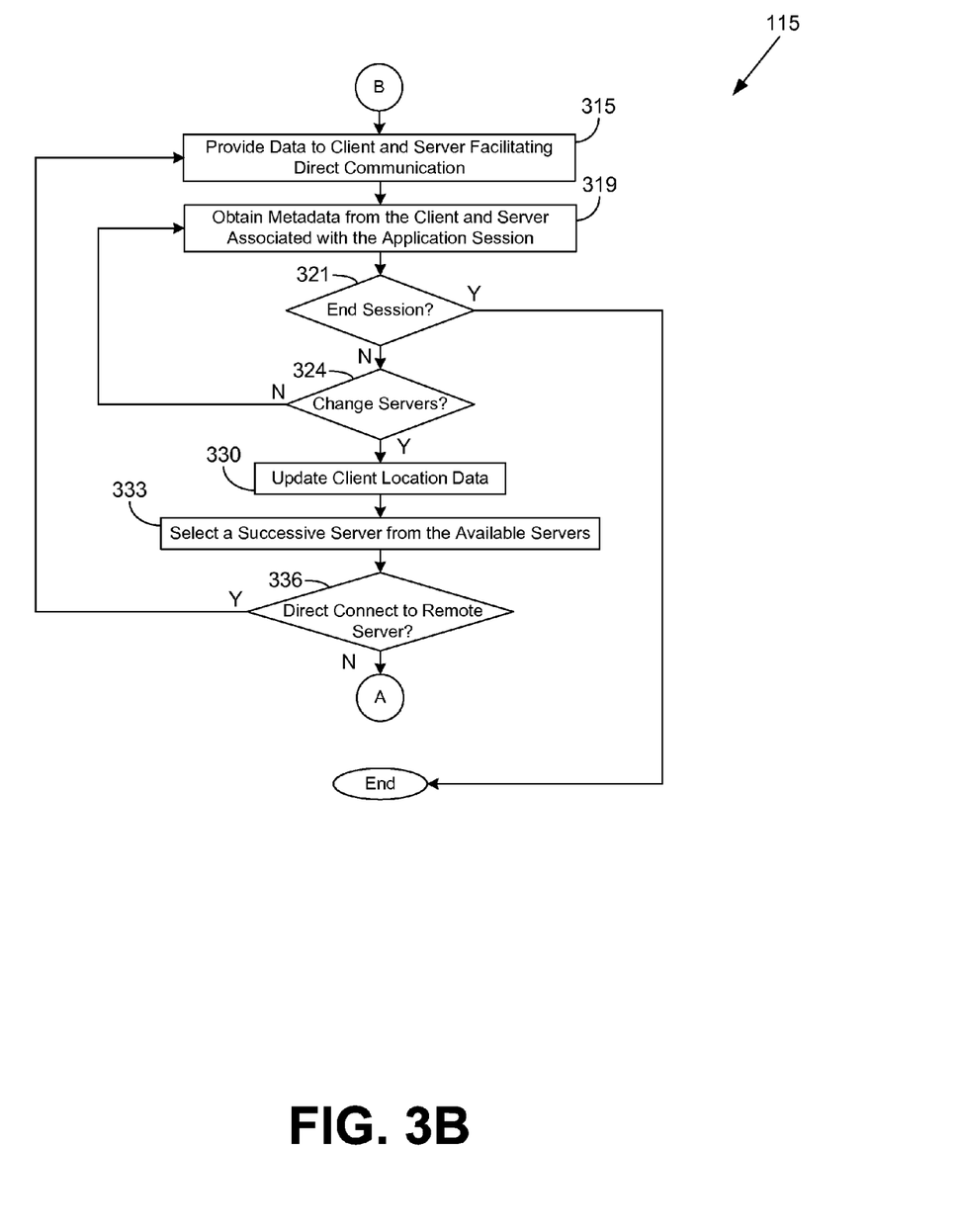

If, in box 313, a remote host 108 is chosen as the preferred application host, and the client 106 is to communicate directly with the remote host 108, execution of the server application 115 continues as shown in FIG. 3B. The client 106 and remote host 108 may be configured to communicate directly for various reasons, such as, for example, to minimize network path latency if they are located on the same network. While some benefits may be realized by this configuration, it may not always be permitted or desired by the client 106 and/or remote host 108 due to network service provider restrictions, network configuration, privacy, and other reasons as can be appreciated.

Alternatively, in box 314, the server application 115 obtains the application output data 123 (FIG. 1) and forwards it to the client 106. Then, in box 316, the server application 115 obtains the application input data 122 (FIG. 1) and provides it to the preferred application host. Next, in box 321, the server application 115 determines whether the session of the application 119 is to be ended. For example, the user may decide to exit the application 119. In some embodiments, the application 119 may subsequently be terminated by the server application 115, while in other embodiments, the application 119 may continue executing in the preferred application host. If the application session is not to be ended, the server application 115 continues to box 324. Otherwise, the portion of the server application 115 ends.

In box 324, the server application 115 may evaluate changing from the preferred application host to a different computing device. As discussed previously, the change may occur if the performance characteristics of the preferred application host fall below a predefined threshold, if other computing devices would offer significant performance improvements, and/or other such factors as can be appreciated. If the server application 115 does not decide to change servers, execution of the server application 115 returns to box 314. Alternatively, if a new server should be chosen, execution of the server application 115 proceeds to box 330. In box 330, the server application 115 may again identify the current location of the client 106. With any clients, but in particular those used in mobile environments, the geographic and/or network connectivity of the client 106 may be subject to change during the course of execution of an application session.

Subsequently, in box 333, the server application 115 identifies a successive application host in which to launch the application session. The successive application host will be chosen from among the computing environment 103 and the remote hosts 108 based upon various factors such as, for example, network and computing resources available, proximity, network and network service provider, network path latency, reliability, and other factors as can be appreciated. If a remote host 108 is chosen as the successive application host for the application session, the server application 115 may notify the remote server application 183 of the pending application session. Thereafter, the successive application host obtains the corresponding application 127 (FIG. 1), video encoder 129 (FIG. 1), wrapper 130 (FIG. 1), and saved state data 133 (FIG. 1) for execution of the application session. Additional data that may be needed, such as user data 136 (FIG. 1), may be retrieved from the server application 115.

If, in box 336, a remote host 108 is chosen as the successive server, and the client 106 is to communicate directly with the remote host 108, execution of the server application 115 continues as shown in FIG. 3B. The client 106 and remote host 108 may be configured to communicate directly for various reasons, such as, for example, to minimize network path latency if they are located on the same network. While some benefits may be realized by this configuration, it may not always be permitted or desired by the client 106 and/or remote host 108 due to network service provider restrictions, network configuration, privacy, and other reasons as can be appreciated.

Alternatively, in box 342, the server application 115 may transition from forwarding the application output data 123 from the preferred application host and instead use the successive application host. To this end, in various embodiments the server application 115 may forward application input data 122 to both the preferred and successive application host. Having the application 119 executing in both application hosts simultaneously may permit an inconspicuous transition of the application session from one application host to the other. Once the application 119 is executing and receiving application input data 122 in both servers, the server application 115 obtains the application output data 123 from both servers. Using various techniques for synchronization, the video streams within the application output data 123 may be synchronized between the two application hosts such that the change in the source of the application output data 123 may be imperceptible. As can be appreciated, various other transition techniques may be employed such as, for example, exclusively using the successive application output data 123 once it begins execution of the application 119. Next, in box 345, the server application 115 discontinues execution of the application 119 on the preferred application host and execution of the server application 115 returns to box 314 with the successive application host being promoted to the role of preferred application host.

Next in FIG. 3B, shown is a flowchart that provides one example of the operation of a portion of the server application 115 according to various other embodiments. It is understood that the flowchart of FIG. 3B provides merely an example of the many different types of functional arrangements that may be employed to implement the operation of the portion of the server application 115 as described herein. As an alternative, the flowchart of FIG. 3B may be viewed as depicting an example of steps of a method implemented in the computing environment 103 (FIG. 1) according to one or more embodiments.

Beginning with box 315, the server application 115 provides the client 106 (FIG. 1) and the remote host 108 (FIG. 1) with the data necessary to establish communications directly between them. The data may include network address data, authentication data, application data and/or other such data as can be appreciated. Next, in box 319, the server application 115 obtains metadata from the client 106 and remote host 108. The metadata may relate to the current state of execution of the application 119 (FIG. 1), network and computing resources available, service requests, errors, network path latency, reliability, and/or other factors as can be appreciated.

Next, in box 321, the server application 115 determines whether the session of the application 119 is to be ended. For example, the user may decide to exit the application 119. In some embodiments, the application 119 may subsequently be terminated by instruction from the server application 115, while in other embodiments, the application 119 may continue executing in the remote host 108. If the application session is not to be ended, the server application 115 continues to box 324. Otherwise, the portion of the server application 115 ends.

In box 324, the server application 115 may evaluate changing computing devices from the preferred application host. As discussed previously, the change may occur if the performance characteristics of the preferred application host fall below a predefined threshold, if other available computing devices would offer significant performance improvements and/or other such factors as can be appreciated. If the server application 115 does not decide to change servers, execution of the server application 115 returns to box 319. Alternatively, if a new server should be chosen, execution of the server application 115 proceeds to box 330. In box 330, the server application 115 may again identify the current location of the client 106. With any clients 106, but in particular those used in mobile environments, the geographic and/or network connectivity of the client 106 may be subject to change during the course of execution of an application session.

Subsequently, in box 333, the server application 115 identifies a successive application host in which to launch the application session. The successive application host will be chosen from among the computing environment 103 and the remote hosts 108 based upon various factors such as, for example, network and computing resources available, proximity, network and network service provider, network path latency, reliability, and other factors as can be appreciated. If a different remote host 108 is chosen as the successive application host for the application session, the server application 115 may notify the remote server application 183 (FIG. 1) of the pending application session. Thereafter, the successive application host obtains the corresponding application 127 (FIG. 1), video encoder 129 (FIG. 1), wrapper 130 (FIG. 1), and saved state data 133 (FIG. 1) for execution of the application session. Additional data that may be needed, such as user data 136 (FIG. 1) may be retrieved from the server application 115.

If, in box 336, a remote host 108 is chosen as the successive server, and the client 106 is to communicate directly with the remote host 108, execution of the server application 115 continues to box 315. Otherwise, execution of the server application 115 continues to box 342 of FIG. 3A.

Figure 4:
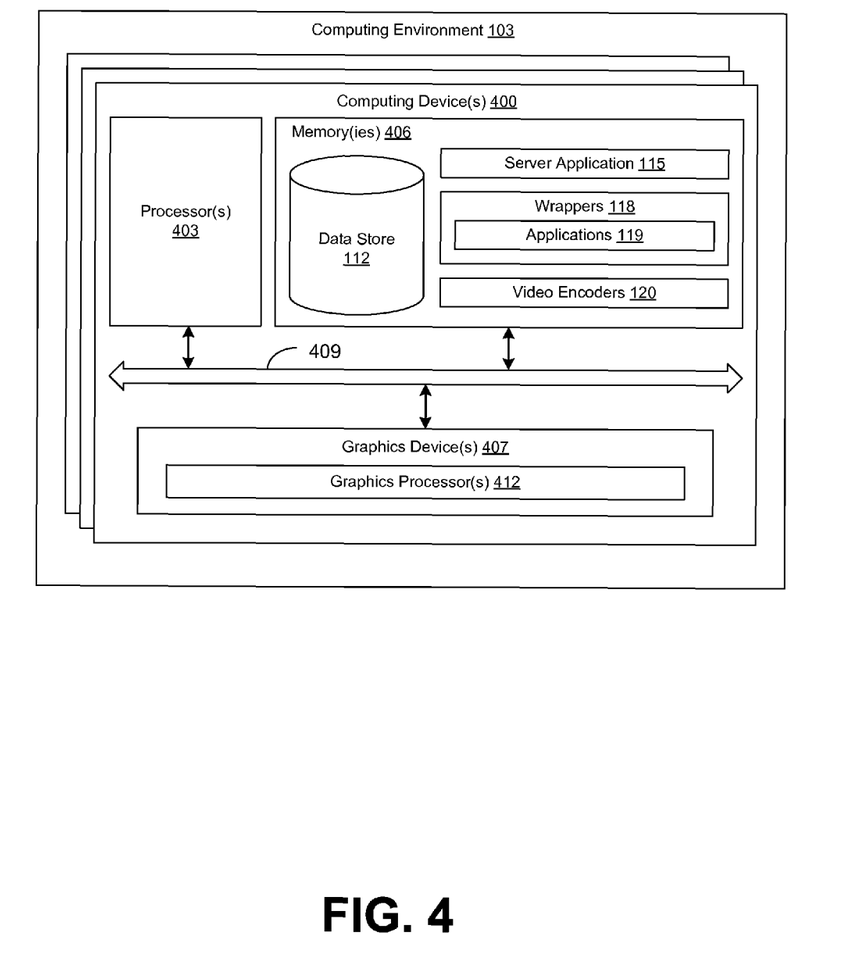
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 may comprise one or more computing devices 400. The computing device 400 includes at least one processor circuit, for example, having a processor 403, a memory 406, and one or more graphics devices 407, all of which are coupled to a local interface 409. To this end, the computing device 400 may comprise, for example, at least one server computer or like device. The local interface 409 may comprise, for example, a data bus with an accompanying address/control bus or other bus structure as can be appreciated. The graphics devices 407 may correspond to high-performance graphics hardware, including one or more graphics processors 412. The graphics devices 407 are configured to render graphics corresponding to the applications 119 executed in the computing device 400.

Stored in the memory 406 are both data and several components that are executable by the processor 403. In particular, stored in the memory 406 and executable by the processor 403 are the server application 115, the wrappers 118, the applications 119, the video encoders 120, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the server application 115, the wrappers 118, the applications 119, the video encoders 120, the client application 145 (FIG. 1), the remote server application 183 (FIG. 1) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3A and 3B show the functionality and operation of an implementation of portions of the client application 145 and the server application 115. If embodied in software, each block may represent a module, segment, or portion of code that comprises program instructions to implement the specified logical function(s). The program instructions may be embodied in the form of source code that comprises human-readable statements written in a programming language, or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2, 3A and 3B show a specific order of execution, it is understood that the order of execution may differ from that which is depicted. For example, the order of execution of two or more blocks may be scrambled relative to the order shown. Also, two or more blocks shown in succession in FIGS. 2, 3A and 3B may be executed concurrently or with partial concurrence. Further, in some embodiments, one or more of the blocks shown in FIGS. 2, 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the wrappers 118, the applications 119, the video encoders 120, the client application 145, and the remote server application 183 that comprises software or code can be embodied in any non-transitory computer-readable medium for use by, or in connection with, an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by, or in connection with, the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium comprising a program having instructions that, when executed, cause at least one computing device to:
   obtain a request to launch an application from a client over a network;
   identify a plurality of candidate application hosts;
   select an application host from the plurality of candidate application hosts;
   transmit a first message to the application host, wherein the first message comprises an instruction directing the application host to initiate execution of the application;
   obtain a media stream from a wrapper for the application that is installed on the application host and emulates an output device for the application host, wherein the media stream comprises an audio stream and a video stream;
   forward the media stream from the application host to the client;
   obtain a plurality of input commands from the client over the network, wherein a portion of the plurality of input commands comprise metadata indicating a temporal position of the video stream with which the ones of the plurality of input commands are associated;
   forward the plurality of input commands to the application host;
   obtain state data from the application host, wherein the state data comprises data corresponding to a state of the execution of the application;
   monitor a plurality of performance characteristics associated with the execution of the application;
   identify a plurality of successive application hosts, wherein the plurality of performance characteristics of individual ones of the plurality of successive application hosts exceed the performance characteristics of the application host;
   select one of the plurality of successive application hosts; and
   transmit a second message to the one of the plurality of successive application hosts, wherein the second message comprises a portion of the state data and a second instruction directing the one of the plurality of successive application hosts to initiate a successive execution of the application based at least in part on at least the portion of the state data.

2. The non-transitory computer-readable medium of claim 1, wherein the application corresponds to a game selected from a library of games.

3. The non-transitory computer-readable medium of claim 1, wherein the first message further comprises the state data, wherein the state data was saved from a previous use of the application by the client.

4. A system, comprising:
   at least one computing device comprising a hardware processor and a memory; and
   an application comprising machine readable instructions stored in the memory that, when executed by the hardware processor of the at least one computing device, causes the at least one computing device to at least:
      select an application host from a plurality of candidate application hosts;
      transmit a first message to the application host, wherein the first message comprises a first instruction directing the application host to initiate execution of an application and forward a media stream associated with the execution of the application to a client via a network, the media stream having been generated by a wrapper of the application installed on the application host that emulates an output device of the application host;
      transmit a second message to the client, wherein the second message comprises a second instruction directing the client to establish communications with the application host over the network, wherein the communications include a plurality of input commands generated by the client, wherein a portion of the plurality of input commands comprise metadata indicating a temporal position of the media stream with which the ones of the plurality of input commands are associated;
      obtain state data from the application host, wherein the state data comprises data corresponding to a state of the execution of the application;
      monitor a plurality of performance characteristics associated with an interactive execution of the application in the application host by the client;
      select one of a plurality of successive application hosts, wherein the plurality of performance characteristics of individual ones of the plurality of successive application hosts exceed the plurality of performance characteristics of the application host; and
      transmit a third message to the application host, wherein the third message comprises a portion of the state data and a third instruction directing the one of the plurality of successive application hosts to initiate a successive execution of the application based at least in part on at least the portion of the state data.

5. The system of claim 4, wherein the application corresponds to a game selected from a library of games.

6. The system of claim 4, wherein the second message further comprises authentication data, wherein the client is configured to use the authentication data to authenticate with the application host.

7. The system of claim 5, wherein the state data further comprise at least one of a plurality of predefined save points in the game.

8. The system of claim 4, wherein the state data further comprises at least one memory image of the application.

9. The system of claim 4, wherein at least one of the plurality of performance characteristics further comprise at least one of a measure of graphics processor utilization or a measure of network bandwidth.

10. The system of claim 4, wherein the application further comprises machine readable instructions stored in the memory that, when executed by the hardware processor, further cause the at least one computing device to at least transmit a fourth message to the client, wherein the fourth message comprises a fourth instruction directing the client to establish communications with the one of the plurality of successive application hosts over the network.

11. A method, comprising:

selecting, in at least one computing device, an application host from a plurality of candidate application hosts;

transmitting, in the at least one computing device, at least one message to the application host, wherein the at least one message comprises an instruction directing the application host to initiate execution of an application;

obtaining over a network, in the at least one computing device, a video stream generated by a wrapper of the application installed on the application host that emulates an output device of the application host;

obtaining, in the at least one computing device, a plurality of input commands from a client over the network, wherein a portion of the plurality of input commands comprise metadata indicating a temporal position of the video stream with which individual ones of the plurality of input commands are associated;

obtaining, in the at least one computing device, state data from the application host, wherein the state data comprises data corresponding to a state of execution of the application;

monitoring, in the at least one computing device, a plurality of performance characteristics associated with the execution of the application in the application host; and selecting, in the at least one computing device, a successive application host from a plurality of candidate successive application hosts, wherein the plurality of performance characteristics of individual ones of the plurality of candidate successive application hosts exceed the performance characteristics of the application host.

12. The method of claim 11, wherein the application corresponds to a game selected from a library of games.

13. The method of claim 11, wherein the plurality of input commands are generated by at least a game controller.

14. The method of claim 11, wherein the plurality of input commands further comprise a timestamp associated with generation of individual ones of the plurality of input commands.

15. The method of claim 11, further comprising:

forwarding, in the at least one computing device, the video stream to the client via the network; and forwarding, in the at least one computing device, the plurality of input commands to the application host via the network.

16. The method of claim 11, wherein selecting the application host is further based at least in part on a geographical proximity to the client.

17. The method of claim 11, wherein the state data further comprises at least one memory image of the application.

18. The method of claim 11, wherein at least one of the plurality of performance characteristics further comprises a measure of graphics processor utilization or a measure of network bandwidth.

19. The method of claim 11, further comprising transmitting, in the at least one computing device, a switch message to the successive application host, wherein the switch message comprises a portion of the state data and a switch instruction directing the successive application host to initiate the execution of the application based at least in part on at least the state data.

* * * * *